United States Patent
Rivshin et al.

(10) Patent No.: US 8,305,640 B2
(45) Date of Patent: Nov. 6, 2012

(54) DISTRIBUTED DATA FLOW FOR PAGE PARALLEL IMAGE PROCESSING WITHIN PRINTING SYSTEMS

(75) Inventors: Isaak Rivshin, Pittsford, NY (US); Raymond J. Clark, Webster, NY (US); Daniel Davies, Palo Alto, CA (US); Dale T. Platteter, Fairport, NY (US); Michael W. Marchetti, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 474 days.

(21) Appl. No.: 12/703,232

(22) Filed: Feb. 10, 2010

(65) Prior Publication Data

US 2011/0194125 A1    Aug. 11, 2011

(51) Int. Cl.
*H04N 1/56* (2006.01)
*G06T 1/20* (2006.01)
(52) U.S. Cl. .......... 358/1.9; 358/515; 358/530; 382/304
(58) Field of Classification Search .................. 358/1.9, 358/515, 518, 530, 540; 382/162, 302, 304; 700/4; 708/230
See application file for complete search history.

(56) References Cited

U.S. PATENT DOCUMENTS

2004/0150840 A1* 8/2004 Farrell et al. ................. 358/1.1
2008/0204781 A1* 8/2008 Kersch et al. ................. 358/1.9

* cited by examiner

*Primary Examiner* — Scott A Rogers
(74) *Attorney, Agent, or Firm* — Fay Sharpe LLP

(57) ABSTRACT

A system renders print jobs via a marking engine. A raster image processor receives the job from the input module and renders it to one or more raster images. One or more contone image processors receive the one or more raster images to perform cross-channel image processing to render the raster images into a form compatible with the marking engine, wherein the output is partially sub-partitioned by color separation. An image refactoring and distribution network completes the sub-partitioning by separation of the rendered contone raster images by color separation and distributes each color sub-partition to a marker channel module specific to each color sub-partition. A marking engine receives the color sub-partitioned image data, marks the image onto a substrate and outputs a hardcopy of the image.

21 Claims, 3 Drawing Sheets

DISTRIBUTED DATA FLOW FOR PAGE PARALLEL IMAGE PROCESSING WITHIN PRINTING SYSTEMS

BACKGROUND

The present disclosure broadly relates to data processing within a printing system. In one particular embodiment, a job is partitioned into job segments that have color separation attributes associated therewith. The job segments are sub-partitioned by color separation and concurrently distributed to appropriate color channels for consumption via a marking engine. It is to be appreciated, however, that the exemplary embodiments set forth herein are also amenable to other like applications.

Electronically generated documents are utilized to record, display and transfer information. Such documents can include word processing files, graphical images, spreadsheets, and electronic mail messages. Printing systems can process image data that describe the content of these documents to render a hardcopy version thereof. Printing systems can vary in scale to accommodate specific throughput requirements related to the amount of imaging data expected to be received and the amount of hardcopy expected to be output. For instance, desktop systems can be employed for low throughput, office and small print-shop systems can be employed for medium throughput and web presses can be employed to meet high throughput requirements. Faster processing and communication between modules is required as system throughput requirements increase. This problem is exacerbated by the use of a single channel to serially process image data within the printing system.

An exemplary conventional printing system 100 is depicted in prior art FIG. 1. The printing system 100 includes an input module 110 that receives jobs transmitted in a page description language (PDL) to provide various instructions to process the job. The input module 110 receives each job to be processed within the printing system 100. A RIP (Raster Image Processor) 120 receives and interprets the PDL used to describe each print job sent from the input module 110, outputting logical sheets in the form of raster images to be rendered on the output media. The logical sheets are sent from the RIP 120 to a contone image processing module 140 that renders contone raster images comprising the logical sheets into a form required by a marking engine 160. A marker channel module 150 processes the logical sheets serially on a color separation basis and then sends them to the marking engine 160 to provide a hardcopy output 180 of the job.

As printing system throughput requirements increase for higher end printers, cost/performance tradeoffs for each of these functions becomes increasingly difficult until the required throughput cannot be met with a simple series pipeline of functions. Greater throughput can be achieved at any stage by replicating one or more functional blocks to enable concurrency, thus partitioning the task at those positions in the pipeline. While this increases the net throughput through these functional blocks, it also introduces new complexity and issues associated with partitioning of the data flow, coordination, and communications.

Accordingly, systems and methods are needed to provide flexible, modular, extensible data processing within printing systems to meet substantially any throughout requirements wherein performance and functionality can be easily scaled.

BRIEF DESCRIPTION

In one aspect, a system renders print jobs via a marking engine. A raster image processor receives the job from the input module and renders it to one or more raster images. One or more contone image processors receive the one or more raster images to perform cross-channel image processing to render the raster images into a form compatible with the marking engine, wherein the output is partially sub-partitioned by color separation. An image refactoring and distribution network completes the sub-partitioning by separation of the rendered contone raster images by color separation and distributes each color sub-partition to a marker channel module specific to each color sub-partition. A marking engine receives the color sub-partitioned image data, marks the image onto a substrate and outputs a hardcopy of the image.

In another aspect, a device renders an image including means for receiving logical sheets in the form of full color contone raster images and renders the contone raster images into a form for consumption by a marking engine. The raster images are partially sub-partitioned by color separation. Means for distributing the rendered contone raster images are employed to complete the sub-partitioning by separation of the rendered contone raster images. Means for receiving the distributed sub-partition related to a particular color are used wherein the partition by job segment is eliminated leaving the partition by color of the rendered image data. Means are employed for receiving and marking a hardcopy rendering of the image data based on the color sub-partitions.

In yet another aspect, a method renders an image comprising receiving a print job in the form of a PDL from an outside source. The print job is partitioned into a plurality of job segments, the job segments are partitioned spatially. The job segments are rendered into vector objects or contone raster images, wherein the vector objects or raster images are partially sub-partitioned by color separation. The rendered vector objects or image data is sub-partitioned by color separation, which completes the sub-partitioning by separation of the rendered vector objects or contone raster images. Each color sub-partition of the image is distributed to an appropriate color marker channel module. Each color sub-partition is received and wherein a hardcopy output of the image data is rendered via a marking engine.

DETAILED DESCRIPTION

Figure 1:
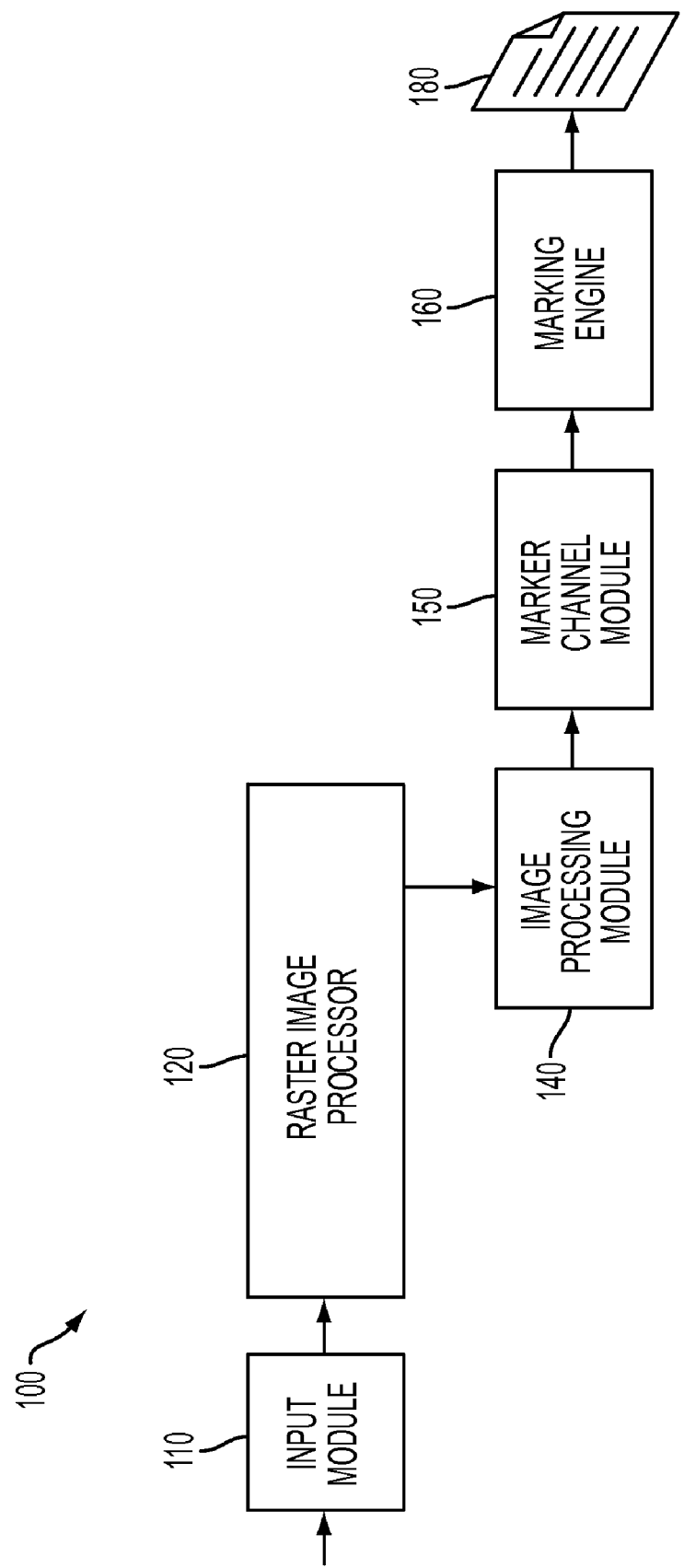
FIG. 1 illustrates a conventional printing system that receives and processes a print job to render a hardcopy output, in accordance with an exemplary embodiment.

The following definitions apply to each term as utilized within this disclosure. It is to be appreciated that if more than one interpretation is indentified, the definition relates to the interpretation with the broadest scope.

"Job" Information sent to a printing system that describes a desired output. This information is in the form of a Page Description Language (PDL) such as Postscript, PDF, PCL, IPDS, etc. Anything that a printer accepts and prints can be considered to be a PDL.

"Job Segment" Subdivision of the job identified and communicated or processed independently for the convenience or efficiency of the printing system. Each job segment may be comprised of one or more lower level subdivisions, such as Logical Pages or Logical Sheets, and if so comprised, these lower level subdivisions may or may not have a correlation to how they are sequenced, grouped or described in the input job or how they will appear on the final marked output. Job Segments are expressed in varying forms at different points in the system, and may or may not be encoded to reduce redundancy and minimize data size or communication bandwidth requirements.

"Logical Page" Pages as perceived by an end user of the document. For example, this can be a one-to-one correspondence with one side of a sheet of paper, or in the case of a multi-fold document, a single panel of such document.

"Logical sheet" The smallest portion of the job distinguished by the marking engine. In a cut-sheet system this would typically be one side of a literal sheet of paper. In a continuous feed web press it would be one side of a segment of the continuous web being marked on. For a continuous feed web press, this is often referred to as a web frame, a frame, or a form. Multiple logical pages can be imposed onto a logical sheet. If no imposition is performed, each logical page is also a logical sheet, and no differentiation is made.

"Refactoring" The process of reorganizing the data within a printing system without modifying its intended interpretation in order to improve its synergy with the operations that must be performed, and with the implementation of the functional blocks and technologies used to perform those operations. This enables functions having disparate requirements to all have a flexible, extensible, efficient, and cost-effective implementation. In one example, a job is partitioned into job segments that have color separation attributes associated therewith. The job segments are sub-partitioned by color separation and concurrently distributed to appropriate color channels for consumption via a marking engine. A marker channel module eliminates the partition by job segment as the job segments are received, while leaving the partition by color intact.

It is to be appreciated that although the systems and methods herein may depict a single component to perform a particular function, substantially any number of components can be employed to provide the functionality described. Communication between components can be performed via any suitable hardwire (e.g. Ethernet, dedicated data and clock, etc.) and/or wireless protocol utilizing substantially any media to facilitate such communication. Similarly, the disparate components within the systems described can be physically implemented in substantially any manner. For example, in some instances particular functionality can be degenerate or not present based on system requirements. Alternatively or in addition, disparate functionality can be performed jointly within a single component. Further, two or more components can be part of a single physical component and/or within the same housing. Distance between components can also be geographically unrestricted wherein connectivity is facilitated via an international network such as the Internet.

Figure 2:
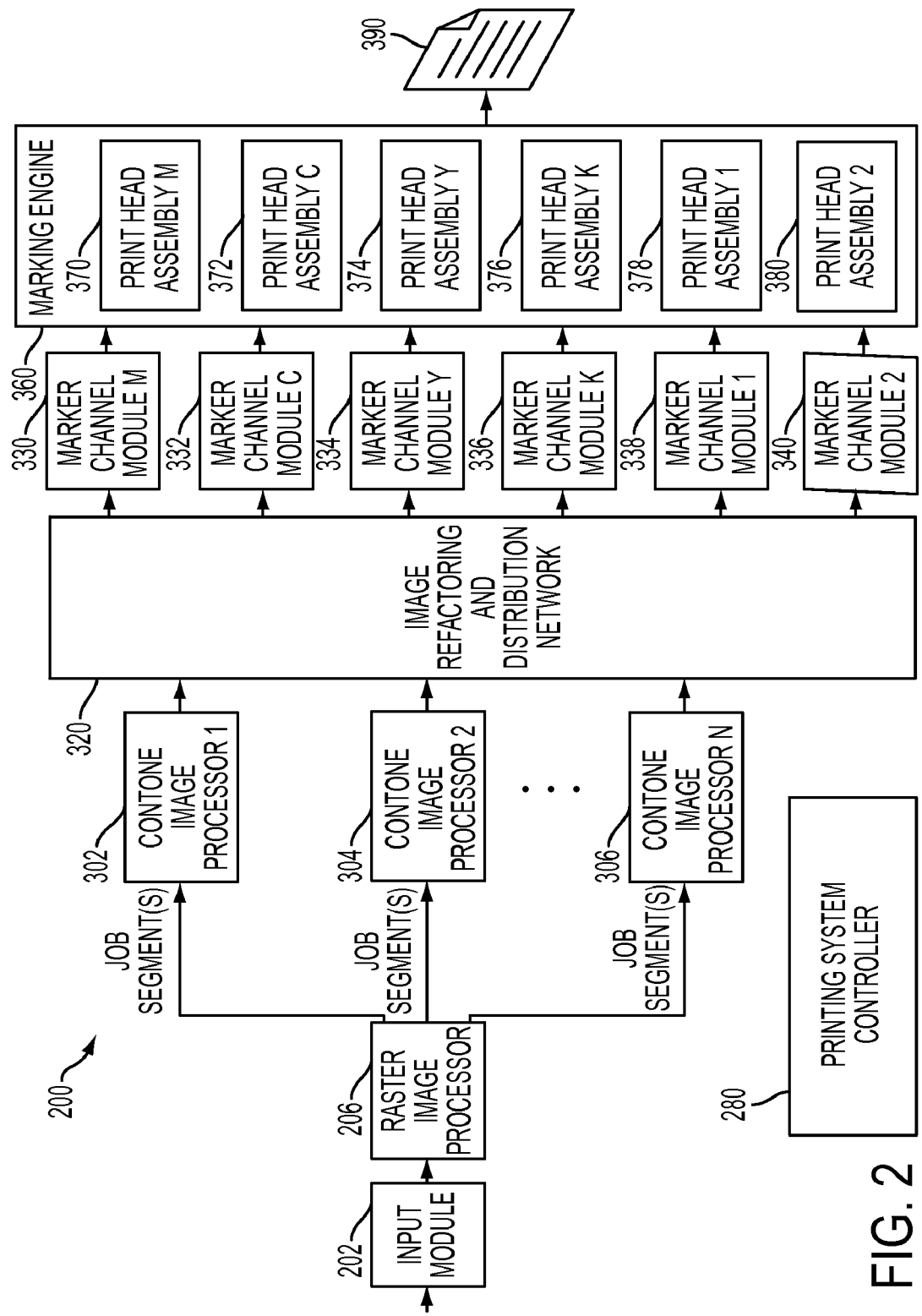
FIG. 2 illustrates a printing system that RIPs a PDL print job into a plurality of concurrent streams of job segments in the form of contone raster images, renders and sub-partitions image data by color separation and renders a hardcopy output therefrom, in accordance with an exemplary embodiment.

FIG. 2 depicts a printing system 200 that receives print jobs and renders them into a hardcopy via a marking engine. Jobs are received by an input module 202 from an outside source such as a network, a processor, a user interface, etc. In one example, the jobs are sent in a PDL, which provides instructions related to appropriate processing of the job within the printing system 200. The input module 202 can serve as a network interface to receive the jobs and to perform job-level spooling as well as various job management functions as required.

The input module 202 provides jobs to the Raster Image Processor 206, which RIPs the job into one or more job segments in the form of raster images. These job segments are then provided to any number of contone image processors 302, 304, and 306 in one or more concurrent streams. A plurality of streams may be provided as a synergistic outcome of concurrency within the RIP or for the benefit of the contone image processors or both. As the contone image processing requires all image information, separations, and metadata to process the image properly, a plurality of streams necessarily partitions the job spatially, most likely but not necessarily along logical sheet boundaries, so that each contone image processor has all information pertaining to the segment of the job that it is processing. It is to be appreciated that spooling and/or compression of image data is contemplated at suitable locations throughout the printing system 200. For the sake of brevity, however, they will not be discussed further herein.

Contone image processors 302, 304, and 306 render contone raster images comprising one or more of the job segments 260-264 into a suitable form for processing by the marking engine 360 (i.e. the required bit depth, format, and semantics) and/or with color management appropriate for the marking engine 360. In addition, the contone image processors 302, 304, and 306 can perform mathematical and/or heuristic image manipulation on the job segments 260-264. Such image manipulation can be employed to produce or improve desirable color or spatial image characteristics such as color rendition, gamut, sharpness, smoothness, contrast, shadow detail, etc. Additional manipulation can improve synergy of the image with the marking engine 360 with which it will be marked. The raster images can also be pre-compensated for non-idealities of the marking engine 360 such as spatial and/or temporal density variation, linearity, and/or color response. Finally, the contone image processors 302-306 can partially sub-partition the raster images by color separation.

Rendered contone raster images are received from the contone image processors 302-306 by an image refactoring and distribution network 320 that is employed to complete the sub-partitioning of the rendered image data by color separation. Each color separation of the image is distributed to appropriate marker channel modules 330, 332, 334, 336, 338, and 340 by colorant. In this example, magenta sub-partitions are directed to the marker channel module 330; cyan sub-partitions are directed to the marker channel module 332; yellow sub-partitions are directed to the marker channel module 334; black sub-partitions are directed to the marker channel module 336; first color sub-partitions are directed to the marker channel module 338; and second color sub-partitions are directed to the marker channel module 340. It is to be appreciated that any number of color sub-partitions and corresponding maker channel modules can be utilized to facilitate the parallel processing within the printing system 200 as set forth herein. Once the images leave the image refactoring and distribution network, the spatial partitioning is eliminated leaving the partition by color intact for each image.

In one embodiment, the marker channel modules 330-340 each deliver color partitioned images to a corresponding print head assembly within the marking engine 360. In other embodiments, multiple print head assemblies can receive color partitioned images, wherein one or more marker channel modules are used to service those markers. The marking engine 360 can include an assembly of print head assemblies 370, 372, 374, 376, 378, and 380 and associated electronic and mechanical control devices and media motion and management devices capable of accurately marking a received image onto selected media. The print head assemblies 370-380 can each employ electro-mechanical or chemical device marking the received image on the output media, e.g. paper to provide a hardcopy 390.

In this example, the print head assembly 370 accepts magenta sub-partitioned image data from the marker channel module 330; the print head assembly 372 accepts cyan sub-partitioned image data from the marker channel module 332; the print head assembly 374 accepts yellow sub-partitioned image data from the marker channel module 334; the print head assembly 376 accepts black sub-partitioned image data from the marker channel module 336; the print head assembly 378 accepts the first color sub-partitioned image data from the marker channel module 338; and the print head assembly 380 accepts the second color sub-partitioned image data from the marker channel module 340.

The marker channel modules 330-340 each process the image data to coincide to a native format of the marking engine 360 to accommodate features related to the marking system 370 and to provide pre-compensation for marking engine 360 variations and characteristics that are accomplished on marker-ready (e.g. binary) video. Marks required for marking engine control and downstream job handling can also be included. In one example, the marker channel modules 330-340 include interface electronics to the marking engine 360.

Each marker channel module 330-340 can include a buffer (not shown) with a large storage capability. The buffer can be employed to assemble job segments of communication blocks arriving in concurrent and potentially interleaved flows from each of the contone image processors 302-306 at each of the marker channel modules 330-340. The buffer can also re-serialize the job segments created by the front end components such as the Raster Image Processor 210 and the contone image processors 302-306 and mis-ordered by the variations in the processing times of the various upstream modules. The buffer can also provide for the data stream to continue while network protocols detect and recover from data communication errors. Finally, a buffer within each marker channel module 330-340 can decouple the marking engine 360 from any and all upstream processing or communications variations within the printing system 200.

A printing system controller 280 provides control of the entire printing system 200 including abstract functions coordinating and synchronizing activities of all modules within the system 200. The printing system controller 280 can be centralized in function or distributed through the other modules to orchestrate concurrent data processing within the printing system 200. Further, the printing system controller 280 can be coupled to each component within the system 200 via the same media utilized to transmit image data and/or via an entirely separate control network. In one embodiment, the printing system controller 280 is implemented as a processing component within any suitable computing environment. For example, computing architectures including, but not limited to, stand alone, multiprocessor, distributed, client/server, minicomputer, mainframe, supercomputer, digital and analog can be employed in accordance with the present embodiment.

The printing system controller 280 can employ an exemplary environment such as a computer that includes a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit. It is to be appreciated that the components utilized within and coupled to the printing system controller can be commercially available and/or proprietary designs that are custom made for such a purpose.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The printing system controller 280 can further include a hard disk drive, a magnetic disk drive, e.g., to read from or write to a removable disk, and an optical disk drive, e.g., for reading a CD-ROM disk or to read from or write to other optical media. The printing system controller 280 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the printing system controller 280.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the printing system controller 280 can be any of a number of commercially available operating systems.

A user may enter commands and information into the computer through a keyboard (not shown) and a pointing device (not shown), such as a mouse. Other input devices (not shown) may include a microphone, an IR remote control, a track ball, a pen input device, a joystick, a game pad, a digitizing tablet, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, and/or various wireless technologies. A monitor (e.g., the display 116), or other type of display device, may also be connected to the system bus via an interface, such as a video adapter (not shown). Visual output may also be accomplished through a remote display network protocol such as Remote Desktop Protocol, VNC, X-Window System, etc. In addition to visual output, a computer typically includes other peripheral output devices (not shown), such as speakers, printers, etc.

A display can be employed with the printing system controller 280 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the printing system controller 280 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

The printing system 200 provides appropriate communication bandwidth commensurate to the job received, enabling the necessary transformations between the by job segment and by color partitions. In order to improve upon a conventional system, such as 100 in FIG. 1, processing stages within the printing system 200 are parallelized by replicating the components associated therewith to enable concurrent processing. In one example, contone image processors (as well as any desired upstream modules) are parallelized and wherein spatially partitioned segments of the job are emitted. The spatially partitioned segments can refer to logical sheets or segments consisting of job segments. The printing system 200 components that are upstream from contone image processors 302, 304, and 306 are able to output multiple segments of the job concurrently, each at a fraction of the overall system throughput. This partitioning allows the printing system 200 throughput to be multiplied beyond what can be achieved by any simple single pipeline as depicted in the system 100 above.

The printing system 200 compensates for variations in processing time due to page complexity to ensure that the pages are marked on the media in the order specified by the PDL and printing system job configuration and control options. In addition, the system 200 is split by separation for communication to independent marker channel modules 330, 332, 334, 336, 338, and 340. Finally, the synchronous marking engine 360 is decoupled from upstream asynchronous, nondeterministic processes within the printing system 200. In one embodiment, the decoupling is located as far downstream as possible (e.g., directly adjacent to the marking engine 360) to remove the constraint of strict synchronism on as much of the system 200 as possible.

There may also be a need driven by packaging considerations to partition the pipeline within the printing system 200 between the upstream blocks characterized by asynchronous software processing functions (exemplified by a computing platform such as a workstation or rack of blade servers), and the downstream real-time, synchronous marking oriented functions which ultimately interface directly to physical marking devices. The location of decoupling is not relevant, although it can require relatively long cables and requires reliable streaming of data at very high speeds. A number of factors can converge to make this very difficult: Bandwidth requirements, distance, and the need for error-free transmission without even the briefest of discontinuity in data flow. The partitioning can be determined based on a number of factors including difficulty of achieving the throughput of processing nodes and bandwidth of communication channels required at each point within the printing system 200.

Different parts of the printing system 200 naturally partition the logical sheets along different dimensions. For example, the RIP may naturally partition the data spatially. The contone image processors 302-306 require all color separations to be presented synchronized, which is also compatible with spatial partitioning. In contrast, the marking engine 360 can require data to be partitioned by color separation, wherein each separation requires a spatially sequential stream. Although the communication channels within the printing system 200 do not have any partitioning constraints, they may be partitioned to achieve suitable bandwidths and any such partitioning must be compatible with the data organization at both the inputs and outputs of those communications channels. To ensure synchronous data transmission that accommodates both spatial and color partitioning, the data is refactored at some point within the printing system 200. In exemplary embodiment, this refactoring takes place between the contone image processors 302-306 and the marking channel modules 330-340. It is to be appreciated, however, that data refactoring within the printing system 200 can be in any suitable location for this purpose.

The contone image processors 302-206 typically need full color information, requiring concurrency to be enabled through spatial partitioning so that for each pixel, full color information as well as any related metadata both for the pixel itself and for its neighboring context is available for calculations. Full color contone flows out of the RIP and requires high bandwidth to communicate. Thus, in an exemplary embodiment, the contone image processors 320-306 are physically associated with the concurrent streams of groups of logical pages emitted by the RIP. Some of the contone image processor's calculations, however, are oriented toward characteristics and correction of the marking engine 360, necessitating a close coupling to the marking engine 360 in a control sense.

Marking components on the other hand are naturally partitioned by color separation, but require a properly sequenced, contiguous, and isochronous stream of image data. These requirements are extremely inconsistent with the form of the data available from the upstream contone image processors (e.g., spatially partitioned, out of order, and unpredictable delivery time). Accordingly, the marking engine 360 can be isolated from these characteristics of the upstream system. In this manner, the printing system 200 facilitates concurrent parallel data processing by splitting the job stream spatially into job segments (e.g. by logical sheets or groups of logical sheets) far upstream and by maintaining such a split through all cross-channel and all contone processing. The split can be by any arbitrary number of ways, as many as necessary to achieve any arbitrary bandwidth. After all contone and cross-channel processing, the data stream is further partitioned by separation, addressed to the corresponding downstream per-separation channel.

The data stream is sent to the image refactoring and distribution network 320 which, in one embodiment, is one or more of a commercial off the shelf non-blocking network switch, a multiple-input/multiple-output interconnection network, a non-blocking interconnection network, a non-blocking interconnection network with per-packet dynamic routing, a non-blocking network switch, or a non-blocking network switch for a standard network technology such as an Ethernet or ATM. The switch can automatically rearrange the data stream by separation as a result of the network address assigned and the standard routing capabilities of the network switch. The pieces of separation arrive interleaved and out of order, and are reassembled and serialized per separation in a buffer that also serves to decouple the synchronous engine from all of the unpredictable and asynchronous components upstream in the printing system 200. The buffer can also compensate for spatial offset in marking by the marking engine versus separation by enabling a delay in the data stream that varies by separation.

Each data block can be appropriately located in the buffer as indicated by a priori information or metadata, wherein partitions are accepted and placed until each logical sheet is complete. Each logical sheet is assembled in its appropriate position in a stream flowing toward the marking engine 360, despite pages in the vicinity arriving and completing out of order. As long as a given logical sheet is complete before the marking engine 360 reaches its point in the stream, variations in timing caused by all factors are immaterial.

The marker channel module 330-340 needs to know what logical sheet a given network packet is associated with as well as its proper location within that logical sheet. The appropriate color is handled by the routing of the image refactoring and distribution network 320, which delivers packets to the appropriate marker channel module handling their color. The logical sheet and the position can be determined in several ways. For example, each packet can include a logical sheet number and position explicitly set forth within the image.

Alternatively or in addition, the marker channel module 330-340 can utilize a priori information to infer proper placement in the image as each packet is received. In one example, network protocols can provide information in a stream, so that when it is negotiated at the start of the page, it can identify the expected logical sheet to be received. Position in the image could be inferred by the position in the stream, assuming connection oriented protocols such as TCP are used that guarantee in-order, wherein delivery occurs only once to the application.

In another example, a single contone image processor 302-306 can be temporarily paired, for the time required to transfer a job segment, with a single marker channel module 330-340 to burst an entire job segment across, without interleaving with other job segments 260-264. This behavior would require buffering job segments 260-264 in the contone image processors 302-306 until they are complete to ensure that the network link between the two can be completely saturated so that bandwidth is not wasted. Due to the non-blocking nature of the network switch, concurrent connections up to the number of contone image processors 302-306 or the number of marker channel modules 330-340 (whichever is less) can flow concurrently. This scheme also simplifies data management on the receiving end, and so may also be advantageous with any protocol. Neither burst nor average bandwidth requirements are affected, just the granularity of interleaving. A sufficiently large buffer in the per-separation marker channel modules 330-340 relative to the logical sheet size makes this difference immaterial. It is to be appreciated, however, data flow management and placement can be accomplished in any suitable manner.

In addition, for either the output of the contone image processors 302-306 or the input of the marker channel modules 330-340 if a single connection within the image refactoring and distribution network 320 is insufficient, additional connections can be added without increasing system complexity and at little or no additional cost (depending on commodity component configuration). Since the network switch will route traffic to the addressed downstream interface regardless of which output interface is used, traffic within a given contone image processor 302-306 is simply distributed across the available output interfaces according to an appropriate algorithm designed to maintain smooth and efficient data flow given traffic patterns within the printing system 200. In the absence of dynamic routing to automatically balance traffic across input interfaces on the target marker channel module 330-340, contone image processors 302-306 must be told which of the multiple input interfaces it should direct traffic to, or in the case that it should target multiple interfaces on a single marker channel module, what fraction of traffic to direct to each one. Another viable variation would be to have a separate network switch for each marker channel module or marker channel module input interface, with a separate connection from each contone image processor 302-306 to each marker channel module 330-340 input interface. This would require an interface for each marker channel module on each contone image processor. In some regards this is a suboptimal configuration, however it relaxes some constraints in the refactoring and distribution network, and use of commodity industry standard technology also mitigates this impact. The benefits accrued are the ability to utilize smaller network switches or to enable larger configurations with a given network switch size, and to subdivide bandwidth on the contone image processor module side of the switch across several interfaces as a natural outcome of the destination vs. through the routing algorithms discussed previously. Subdividing the distribution and refactoring network also helps to minimize and avoid issues related to network congestion and flow control.

Employing a network switch for the image refactoring and distribution network 320 has several advantages. For example, standard network switches are designed to route packets of information between computers, each computer desiring to communicate with another computer. Each computer has a network address, and information to be sent to that computer is tagged with its address. Each computer is independent of all other computers, having no relationship, and each data stream between two computers is unrelated to every other data stream. Further, each data stream enters and leaves the network with the same semantics. In fact, the goal of the network is to provide a completely transparent connection, appearing as a point-to-point connection despite potentially great complexity in the routing.

The embodiments described herein tag packets of information with an address associated with their color separation, resulting in repartitioning of the information as a side effect of the network switch's routing. The modules feeding the input of the network 320 have spatial semantics, and the modules at the output of the network 320 have color space semantics related to the primary colors used by the marking engine. The act of routing transforms the semantics of the data stream from that of spatial partitioning to separation partitioning by virtue of the semantics of the sources and destinations and the addresses assigned to the packets and the routing behavior of the switch. The raster images can first be partially sub-partitioned by color separation, wherein the image refactoring and distribution network 320 completes the sub-partitioning of the rendered image data by color separation.

In the intended application of a network switch, it is purely an expense required to achieve connectivity. As applied herein, however, it provides functionality in the form of data refactoring that would be required even in the absence of a cabled communication channel. The buffering on the receiving end which is needed to insulate the synchronous print engine 360 from upstream variations in data flow and to serialize the logical sheets delivered by the upstream system out of order also eliminates the vestiges of the spatial partitioning as it assembles and serializes the logical sheets. In this manner, the job comes into the system as a single stream, is partitioned spatially, processed, partitioned further by separation, then has the spatial partitioning removed, ready to be marked via the marker channel modules 330-340.

One advantage of the disclosed embodiments is that it decouples portions of the system that require the data to be organized differently so that they can be independently optimized, and that it does this effortlessly and synergistically, not requiring additional or redundant buffering. Reorganization of image data typically entails extensive if not prohibitive buffering as well as a single node that handles the full system bandwidth as the data is reorganized. Often the buffering is unavoidably redundant, and the high speed node is very expensive if not impractical. This disclosure leverages the normal behaviors of a standard, off-the-shelf network switch to perform a data reorganization function for which it was not intended, enabling each portion of the system to have its data partitioned optimally without incurring disadvantages.

Another advantage is that it performs this decoupling through mature and mainstream networking technology capable of spanning long distances, providing as a side effect the long communication cable required to partition the system into roughly the electronic and the electro-mechanical halves. Use of a network switch implements the high-bandwidth node that must be able to carry the full system bandwidth in a commercial, of-the-shelf device. This switch is the result of the focused, unrelenting investment of society to reduce this nexus function to mass production at negligible cost for the office networking environment, routing packets of unrelated information from unrelated sources to unrelated destinations. The invention capitalizes on the characteristics of this device to restructure the data from the organization needed by the contone image processors 302-306 and possibly the RIP to that needed by the marker channel modules 330-340 and the marking engine 360 without significant engineering effort or system cost.

Use of mainstream network technology to partition the printing system 200 also allows the upstream system partition (for example the input module 202 through the contone image processors 302-306) and downstream system partition (for example the marker channel modules 330-340 through the marking device 360) to be geographically distant. In this case the image distribution and refactoring network would retain the routing characteristics of a network switch while also providing the routing and network forwarding capabilities of a wide area network, possibly including building or campus network infrastructures, or the public world-wide Internet. If adequate control can be maintained over bandwidth variation and latency, a modest increase in the marker channel modules 330-340 buffer can accommodate the larger network propagation and error recovery delays. If adequate control cannot be maintained, inclusion of a spooling disk in the marker channel modules 330-340 could spool jobs until they were complete before committing the marking engine 360. A few terabytes would accommodate even a worst-case web-press job.

Figure 3:
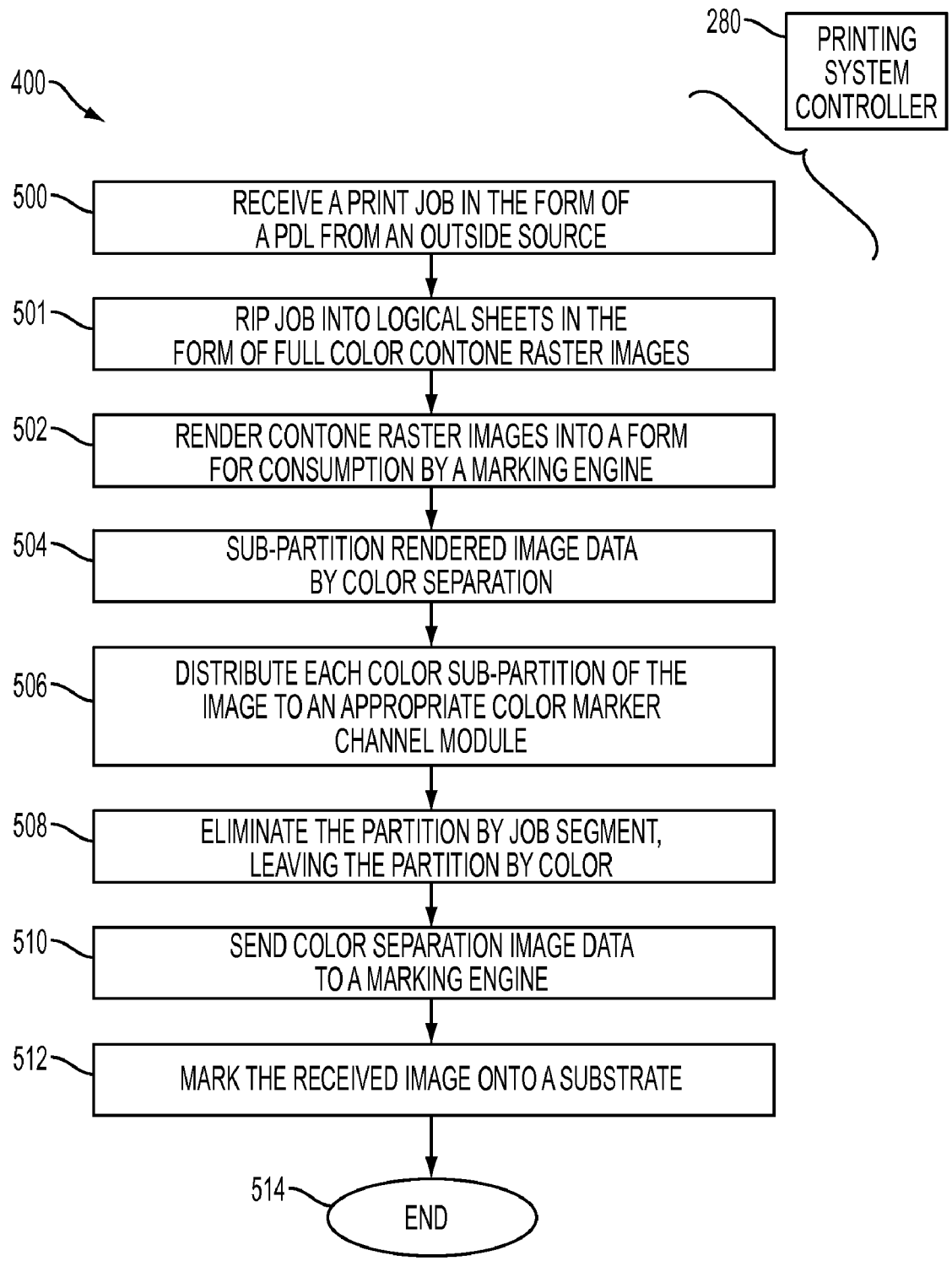
FIG. 3 illustrates a methodology to RIP a print job into logical sheets as contone raster images, which are rendered and sub-partitioned into color-separated image data and marked onto a substrate, in accordance with an exemplary embodiment.

FIG. 3 illustrates a methodology 400 to receive and process a print job into contone raster images within a printing system. The method can be implemented by tying one or more steps to a processor within the printing system controller 280. At reference numeral 500, a print job is received in the form of a PDL from an outside source such as a network, a user interface, a processor, etc. The print job contains instructions via the PDL on how to properly construct and render images described therein. At 501, the job is RIPed (e.g., partitioned) into logical sheets in the form of full color contone raster images. The logical sheets are subsequently output as concurrent job segments.

At 502, the contone raster images from step 403 are rendered into a form for consumption via a marking engine such as one bit per pixel per marking engine separation binary or contone of specified bit depth, format, and semantics, for example. At 504, job segment image data is sub-partitioned by color separation. At 506, each color sub-partition of the image is distributed to an appropriate color marker channel module. This distribution can be facilitated by an image refactoring and distribution network, which also eliminates the partition by job segment while leaving the partition by color of the image data. At 508, the partition by job segment is eliminated, leaving the partition by color.

The color separation image data is sent to a marking engine at 510 wherein the received image is marked onto a substrate by the marking engine at 512. In one embodiment, a particular marker channel module exclusively handles each color as appropriate. For example, image data partitioned into six different colors can be sent to the marking engine via six color specific marker channels. The marking engine can include six print head assemblies that correspond to the marker channels to allow independent processing and marking of an image without a bottleneck in data flow. At 514, the method ends.

It will be appreciated that various of the above-disclosed and other features and functions, or alternatives thereof, may be desirably combined into many other different systems or applications. In one particular example, print jobs are segmented into vector objects in place of or in association with raster images. The vector objects can be representative of one or more of a line, a polygon, a solid area, a patterned area, a circle, an oval, a point, a curve, a Bézier curve, a Bezigon, a letter, a glyph from a font, etc. Also that various presently unforeseen or unanticipated alternatives, modifications, variations or improvements therein may be subsequently made by those skilled in the art which are also intended to be encompassed by the following claims.

The invention claimed is:

1. A system that renders print jobs via a marking engine, comprising:
   a raster image processor that receives the job from the input module and renders it to one or more raster images;
   one or more contone image processors that receive the one or more raster images to perform cross-channel image processing to render the raster images into a form compatible with the marking engine, wherein an output from the one or more contone image processors is partially sub-partitioned by color separation;
   an image refactoring and distribution network that completes the sub-partitioning by separation of the rendered contone raster images by color separation and distributes each color sub-partition to a marker channel module specific to each color sub-partition; and a marking engine that receives the color sub-partitioned image data, marks the image onto a substrate and outputs a hardcopy of the image.

2. The system according to claim 1, wherein the raster image processor processes and outputs the job segments concurrently.

3. The system according to claim 2, wherein the raster image processor job segments are eliminated by the image refactoring and distribution network.

4. The system according to claim 1, wherein the image refactoring and distribution network is one or more of a multiple-input/multiple-output interconnection network, a non-blocking interconnection network, a non-blocking interconnection network with per-packet dynamic routing, and a non-blocking network switch.

5. The system according to claim 4, wherein the marking engine includes a plurality of print head assemblies each of which is specific to one color.

6. The system according to claim 5, wherein one or more print head assemblies receive data associated with one color from a corresponding marker channel module of the same color.

7. The system according to claim 1, further including an input module that provides a network interface to receive the job from a network.

8. The system according to claim 1, further including a printing system controller that controls the processes within the system.

9. The system according to claim 1, wherein the logical sheets that designate break points in the marking are comprised of a plurality of logical pages.

10. The system according to claim 1, wherein the one or more marker channel modules assemble communication blocks of data into job segments.

11. The system according to claim 1, wherein the one or more marking channels re-serialize the job segments created by upstream modules.

12. The system according to claim 1, wherein the one or more marker channel modules decouple the marking engine from components connected upstream to the one or more marking channel modules.

13. A device that renders an image, comprising:

means for receiving logical sheets in the form of full color contone raster images and to render the contone raster images into a form for consumption by a marking engine, the raster images are partially sub-partitioned by color separation;

means for distributing the rendered contone raster images and to complete the sub-partitioning by color separation of the rendered contone raster images;

means for receiving the distributed sub-partition related to a particular color, leaving the partition by color separation of the rendered image data; and, means for receiving the color separation sub-partitions and marking a hardcopy rendering of the image data.

14. The system according claim 13 wherein means for marking includes a plurality of printhead assemblies that each correspond to a particular color, each printhead assembly correlates to one marker channel module of the same color.

15. The system according to claim 13 wherein the means for distributing and refactoring is one or more of a multiple-input/multiple-output interconnection network, a non-blocking interconnection network, a non-blocking interconnection network with per-packet dynamic routing, and a non-blocking network switch.

16. The system according to claim 15, wherein the non-blocking network switch communicates using a standard network technology.

17. The system according to claim 13, further including means for spatially partitioning a print job into one or more job segments.

18. A method that renders an image, comprising:

receiving a print job in the form of a PDL from an outside source;

partitioning the print job into a plurality of job segments, the job segments are partitioned spatially;

rendering the job segments into vector objects or contone raster images, wherein the vector objects or raster images are partially sub-partitioned by color separation;

sub-partitioning the rendered vector objects or image data by color separation to complete the sub-partitioning by separation of the rendered vector objects or contone raster images, wherein the spatial partitioning is eliminated;

distributing each color sub-partition of the image to an appropriate color marker channel module; and receiving each color sub-partition and rendering a hardcopy output of the image data via a marking engine.

19. The method according to claim 18 wherein each job is processed by a Raster Image Processor into one or more concurrent streams of job segments.

20. The method according to claim 19 further including distributing the objects to a plurality of contone image processing modules.

21. The method according to claim 18, wherein each vector object represents one or more of a line, a polygon, a solid area, a patterned area, a circle, an oval, a point, a curve, a Bézier curve, a Bezigon, a letter, and a glyph from a font.

* * * * *